(12) United States Patent
Fukuda

(10) Patent No.: US 8,285,108 B2
(45) Date of Patent: Oct. 9, 2012

(54) IMAGE-CAPTURE DEVICE, IMAGE-CAPTURE METHOD, AND IMAGE-CAPTURE PROGRAM

(75) Inventor: Kenichiro Fukuda, Chiba (JP)

(73) Assignee: Sony Corporation, Tokyo (JP)

( * ) Notice: Subject to any disclaimer, the term of this patent is extended or adjusted under 35 U.S.C. 154(b) by 291 days.

(21) Appl. No.: 12/655,949

(22) Filed: Jan. 11, 2010

(65) Prior Publication Data

US 2010/0177207 A1 Jul. 15, 2010

(30) Foreign Application Priority Data

Jan. 14, 2009 (JP) .............................. P2009-006098

(51) Int. Cl.
*H04N 5/77* (2006.01)
(52) U.S. Cl. .................... 386/228; 348/231.3
(58) Field of Classification Search .................. 386/228, 386/229; 348/231.99, 231.3
See application file for complete search history.

(56) References Cited

U.S. PATENT DOCUMENTS

| 8,045,013 B2 * | 10/2011 | Abe .......................... 348/222.1 |
| 2008/0037841 A1 | 2/2008 | Ogawa |
| 2008/0106603 A1 * | 5/2008 | Whitehead et al. ........ 348/207.1 |

FOREIGN PATENT DOCUMENTS

| JP | 2003348569 A | 12/2003 |
| JP | 2004-046591 A | 2/2004 |
| JP | 2006080651 A | 3/2006 |
| JP | 2006-166184 A | 6/2006 |
| JP | 2007281689 A | 10/2007 |
| JP | 2008-042319 A | 2/2008 |
| JP | 2008084213 A | 4/2008 |
| JP | 2008113262 A | 5/2008 |
| JP | 2008193411 A | 8/2008 |

OTHER PUBLICATIONS

Office Action from Japanese Application No. 2009-006098, dated Jan. 4, 2011.
Office Action from Japanese Application No. 2009-006098, dated Mar. 15, 2011.

* cited by examiner

*Primary Examiner* — Timothy J Henn
(74) *Attorney, Agent, or Firm* — Lerner, David, Littenberg, Krumholz & Mentlik, LLP

(57) ABSTRACT

An image-capture device includes: an image-capture section that captures an image of a subject; a detector that detects a portion of the subject, the portion having a specific feature, from the image captured by the image-capture section; an evaluator that determines a numerically expressed evaluation value of the specific feature of the portion detected by the detector; a buffer section that temporarily stores delayed images corresponding to a predetermined amount of time; and a recording-operation controller that controls the image-capture device to record image data including a predetermined delayed image in the buffer section, upon determining that the evaluation value satisfies a predetermined condition.

9 Claims, 12 Drawing Sheets

IMAGE-CAPTURE DEVICE, IMAGE-CAPTURE METHOD, AND IMAGE-CAPTURE PROGRAM

CROSS-REFERENCE TO RELATED APPLICATION

The present application claims priority from Japanese Patent Application No. JP 2009-006098 filed in the Japanese Patent Office on Jan. 14, 2009, the entire content of which is incorporated herein by reference.

BACKGROUND OF THE INVENTION

1. Field of the Invention

The present invention relates to image-capture devices, image-capture methods, and image-capture methods. More specifically, the present invention relates to image-capture devices, such as cameras and video cameras.

2. Description of the Related Art

Typically, in photography using an image-capture device such as a camera or video camera, when a situation that the operator thereof wants to take a photograph appears, he or she presses an operation button or the like, provided in an operation section, to give a recording-start instruction to the camera or video camera.

For example, when the operator wants to photograph a child's smile by using a camera, the operator has to pay attention to the child so that he or she faces the camera, while holding the camera, and has to wait for the child to smile, to press a photography button. As a result, the operator often misses photographing which is caused by a late operation.

When the operator wants to photograph a child's smile by using a video camera, there is a possibility that it is too late to perform an operation, as in the case of the camera. Even when the operator operates at an appropriate timing, a cause of the smile of the child and a state of change in the facial expression may not generally be photographed.

Thus, the operator may press the photography button earlier so as to prevent a late operation, thus wasting power, resources of a recording medium, and so on. Some methods have been conceived in order to solve the above-described problems.

For example, Japanese Unexamined Patent Application Publication No. 2008-42319 discloses a camera and a video camera that calculate an evaluation value indicating the degree of a facial expression on the basis of facial information of a subject and that automatically starts recording when the evaluation value exceeds a predetermined threshold.

For example, Japanese Unexamined Patent Application Publication No. 2006-166184 discloses a video camera that can start recording a few seconds before a photography-start operation is performed, in order to prevent missing photographing which is caused by a late photography-start operation.

SUMMARY OF THE INVENTION

When the image-capture device disclosed in Japanese Unexamined Patent Application Publication No. 2008-42319 is applied to a video camera, it is possible to record video of a subject after a particular situation appears. However, there is a problem in that an event that causes occurrence of the situation and a process of change in the situation may not generally be recorded.

With the video camera disclosed in Japanese Unexamined Patent Application Publication No. 2006-166184, when the photographing person performs a photography-start operation at an appropriate timing, it is possible to photography a subject in a particular situation and a process of a change in the situation.

However, there is a problem in that a desired scene may not generally be recorded when the photograph-start operation of the photographing person is too late or the photographing person fails to perform the operation. In addition, the photographing person having to pay attention to both the photography-start operation and the subject is also one cause of the late operation and a failure of performing the operation.

Accordingly, it is desirable to provide a novel and improved image-capture device that can automatically record images of a subject in a particular situation and a cause and a process of change in the situation.

According to an embodiment of the present invention, there is provided an image-capture device. The image-capture device includes: an image-capture section that captures an image of a subject; a detector that detects a portion of the subject, the portion having a specific feature, from the image captured by the image-capture section; an evaluator that determines a numerically expressed evaluation value of the specific feature of the portion detected by the detector; a buffer section that temporarily stores delayed images corresponding to a predetermined amount of time; and a recording-operation controller that controls the image-capture device to record image data including a predetermined delayed image in the buffer section, upon determining that the evaluation value satisfies a predetermined condition.

With this arrangement, the image-capture device holds the images, obtained by image capture, in the buffer section while constantly overwriting images corresponding to a predetermined amount of time. Thus, it is possible to record previous images when photography is started.

A desired scene is detected based on the evaluation values and a recording-start operation is automatically performed. This arrangement can prevent missing photographing.

The recording-operation controller may determine the recording-start point of the images in the buffer section, on the basis of the evaluation vales stored in the buffer section.

With this arrangement, of delayed images in the buffer section, a portion that is wanted to be recorded can be selected based on the evaluations values. This arrangement makes it possible to more efficiently record only an image at a desired scene.

The predetermined condition for starting the recording can be arbitrarily set in association with the evaluation values. For example, the predetermined condition may be set to a condition that the evaluation value changes to be greater than or equal to a first threshold.

The predetermined condition for starting the recording may also be set to a condition that a rate of increase in the evaluation value changes to be greater than or equal to a predetermined threshold.

The recording-start time of the images in the buffer section may be set in various manners in association with the evaluation values recorded in the buffer section.

For example, the recording-start point of the images in the buffer section may be set to a point of time when the evaluation value is greater than or equal to a second threshold.

The subject to be photographed by the image-capture device and the numerically expressed evaluation value of an attribute of the subject may be set arbitrarily. For example, when the subject is set to a person, the evaluation value may be a value obtained by evaluating a facial expression.

The facial expression to be evaluated may be a smile, an angry face, or a crying face. With this arrangement, it is possible to detect and record a facial expression, such as a smile, an angry face, or a crying face, of a subject.

The recording-operation controller may set a condition for stopping the recording. The condition may be set based on a rate of increase or decrease in the evaluation value or may be set based on time. The conditions may also be used in combination.

For example, the condition for stopping the recording may be a condition that a certain amount of time passes after the evaluation value falls below the first threshold after start of the recording. Since the recording-stop condition is set in this manner, the stop of the recording is also automatically performed. This arrangement allows the operator of the image-capture device to perform photography without paying attention to the operation thereof.

The recording-operation controller may control the image-capture device to record the evaluation value corresponding to an image to be recorded, in conjunction with the image. With this arrangement, after recording, control can also be performed based on the evaluation value.

According to another embodiment of the present invention, there is provided an image-capture method for an image-capture device. The method includes the steps of: capturing an image of a subject; detecting a portion of the subject, the portion having a specific feature; determining a numerically expressed evaluation value of the specific feature of the detected portion; determining whether or not the evaluation value satisfies a predetermined condition; determining a recording-start time; and recording image data from the recording-start time.

According to still another embodiment of the present invention, there is provided an image-capture program for causing an image-capture device to execute the steps of: capturing an image of a subject; detecting a portion of the subject, the portion having a specific feature; determining a numerically expressed evaluation value of the specific feature of the detected portion; determining whether or not the evaluation value satisfies a predetermined condition; determining a recording-start time; and recording image data from the recording-start time.

As described above, the present embodiment makes it possible to prevent missing photographing which is caused by a late operation or a failure of an operation and also makes it possible to automatically record images of a subject in a particular situation and a cause and a process of change in the situation.

DESCRIPTION OF THE PREFERRED EMBODIMENT

Figure 1:
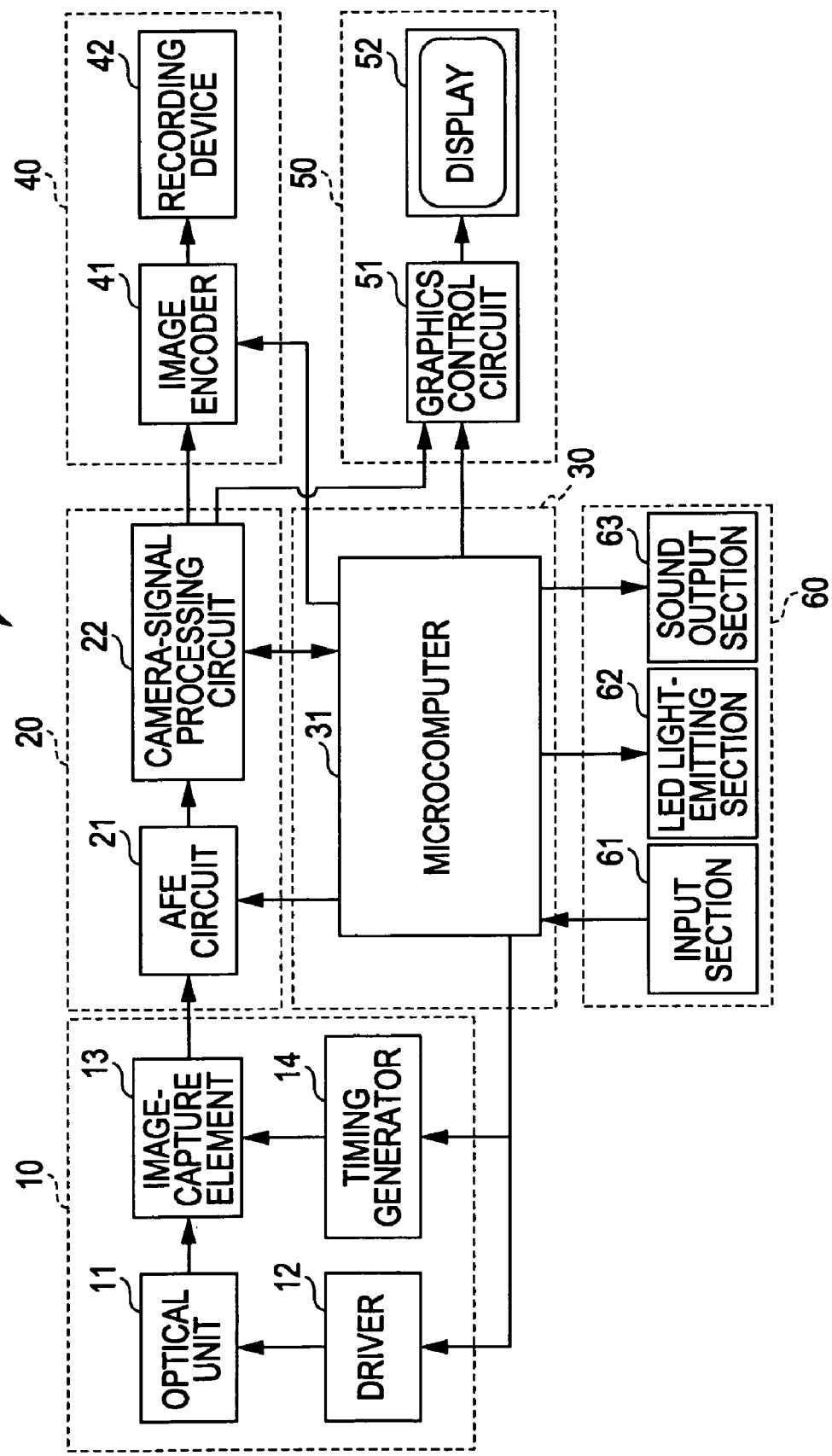
FIG. 1 is a block diagram showing one example of the overall configuration of an image-capture device to which the present invention is applicable.

A preferred embodiment of the present invention will be described below in detail with reference to the accompanying drawings. Herein and in the drawings, elements having substantially the same functional configurations are denoted by the same reference numerals, and redundant descriptions are not given.

A description below is given in the following sequence:
1. Overall Configuration of Image-Capture Device according to Embodiment of Invention
2. Recording Functional Configuration of Image-capture device according to Embodiment of Invention
3. Display Functional Configuration of Image-capture device according to Embodiment of Invention
4. First Illustrative Example (Recording-Start Time is Fixed based on Time)
5. Second Illustrative Example (Recording-Start Time is Determined based on Evaluation Value)
6. Conclusion 1. Overall Configuration of Image-Capture Device According to Embodiment of Invention The overall configuration of an image-capture device according to one embodiment of the present invention will first be described with reference to FIG. 1. Although a main feature of the image-capture device according to the embodiment lies in an internal functional configuration described below in FIG. 2 and subsequent drawings, an overall configuration will now be described to help overall understanding.

FIG. 1 is a block diagram showing the overall configuration of the image-capture device according to the embodiment of the present invention. An image-capture device 100 shown in FIG. 1 has a function for capturing a still image or a moving image and is realized as, for example, a digital still camera or a digital video camera.

Needless to say, the image-capture device 100 may be realized as a digital camera or video camera included in a mobile phone. The image-capture device 100 may also be realized as a camera or video camera provided at a personal computer.

The image-capture device 100 may also be realized in digital electronic equipment. Alternatively, the image-capture device 100 may be implemented as a surveillance camera.

[Overall Configuration of Image-Capture Device]

The image-capture device 100 generally includes an image-capture section 10, a processor 20, a controller 30, a recording section 40, a display section 50, and an input/output section 60.

The image-capture section 10 captures an image of a subject by using an image-capture element 13. The processor 20 performs various types of processing on the image captured by the image-capture section 10. The controller 30 centrally controls various functions of the image-capture device 100. On the basis of the image received from the processor 20 and a control signal received from the controller 30, the recording section 40 records the image to a recording medium.

The display section 50 displays various types of report information and the image, captured by the image-capture section 10, on a display 52 viewed by an operator. An input/output section 60 allows the operator to perform input for setting and/or operation and outputs report information to the operator, a subject, and so on. Details of the individual sections will be described below.

[Configuration of Image-Capture Section]

First, a description will be given of a main configuration of the image-capture section 10 having the function for capturing an image of a subject by using the image-capture element 13. The image-capture section 10 generally includes an optical unit 11, a driver 12, the image-capture element 13, and a timing generator 14.

The optical unit 11 serves as an optical system for collecting, onto the image-capture element 13, light from the subject, and has a lens, a drive mechanism for moving the lens to perform focusing and zooming, a shutter mechanism, an iris mechanism, and so on (which are not shown).

On the basis of a control signal from a microcomputer 31, the driver 12 controls driving of each mechanism in the optical unit 11.

The image-capture element 13 is an element for capturing an image of the subject into the image-capture device 100 as a digital signal. The image-capture element 13 is, for example, a CCD (charge coupled device) or CMOS (complementary metal oxide semiconductor) solid-state image-capture element.

The image-capture element 13 is driven on the basis of a timing signal output from the timing generator 14 and converts incident light from the subject into an electrical signal.

The timing generator 14 is an element for outputting the timing signal to sections that involve timing control. In the present embodiment, the timing control 14 outputs a timing signal to the image-capture element 13.

[Configuration of Processor]

Next, a description is given of the processor 20 for performing various types of processing on the image captured by the image-capture section 10. The processor 20 generally has an AFE (analog front end) circuit 21 and a camera-signal processing circuit 22.

The AFE circuit 21 samples and holds the image signal output from the image-capture element 13 so as to maintain a favorable S/N (signal-to-noise) ratio, controls a gain, performs processing such as A/D (analog-to-digital) conversion, and outputs resulting digital image data.

The camera-signal processing circuit 22 performs various types of processing on the image data. In the present embodiment, the camera-signal processing circuit 22 performs, on the image data received from the AFE circuit 21, AF (auto focus), AE (auto exposure), a detection processing for various types of image-quality correction processing, image-quality correction processing based on detection information, and so on.

[Configuration of Controller]

Next, a description will be given of the controller 30 for centrally controlling various functions of the image-capture device 100. The controller 30 generally has the microcomputer 31.

The microcomputer 31 includes a CPU (central processing unit) and a memory, such as a ROM (read only memory) and a RAM (random access memory), and centrally controls the image-capture device 100 by executing a program stored in the memory.

[Configuration of Recording Section]

Next, a description will be given of the recording section 40 having a function for recording a captured image to a recording medium. The recording section 40 generally has an image encoder 41 and a recording device 42.

The image encoder 41 compresses and encodes the image data output from the camera signal processing circuit 22 and outputs encoded data to the recording device 42. When it is not necessary to compress and encode the image data, the image encoder 41 may be eliminated.

The recording device 42 is a recording medium for recording and holding various types of data, and records the encoded data, output from the image encoder 41, as an image file. When the image encoder 41 is not provided, the recording device 42 directly records the image data, not encoded data.

The recording device 42 may have therein a magnetic recording medium, such as a hard disk, or may be an external recording device. Examples of the external recording device include a portable recording medium, such as a magnetic tape or an optical disk, or a nonvolatile memory, such as a flash memory.

[Configuration of Display Section]

Next, a description will be given of the display section 50 having the display 52 that allows the operator to view an image being photographed. The display section 50 generally has a graphics control circuit 51 and the display 52.

The graphics control circuit 51 converts information to be displayed on the display 52 into a signal suitable for display. In the present embodiment, the graphics control circuit 51 converts image data, output from the camera-signal processing circuit 22 or the microcomputer 31, into a signal to be displayed on the display 52.

The graphics control circuit 51 also displays information, such as facial-expression score (described below), on an image in response to a request from the microcomputer 31.

The display 52 is a device that performs display so that an image being photographed and various types of report information can be viewed by the photographing person or the like. In the present embodiment, the display 52 displays an image and so on on the basis of the image data output from the graphics control circuit 51.

The display 52 may be implemented by, for example, a liquid crystal display (LCD) device or an organic EL (electroluminescent) display device, but is not limited thereto.

[Configuration of Input/Output Section]

Next, a description will be given of the input/output section 60 for inputting a signal indicating the operator's operation to the image-capture device 100 and for performing output to the operator. The input/output section 60 generally has an input section 61, an LED (light-emitting diode) light-emitting section 62, and a sound output section 63.

The input section 61 serves as an operation section for outputting, to the microcomputer 31, a control signal corresponding to an operation input performed by the photographing person through various input switches. The input section 61 may be implemented by, for example, a shutter release button, a cross key or a touch panel for performing various menu operations and operation mode setting, and so on, but is not limited thereto.

The LED light-emitting section 62 turns on LEDs on the basis of a control signal from the microcomputer 31. For example, the LEDs are turned on during operation of a self-timer function.

The sound output section 63 outputs sound, such as an operation confirmation sound, on the basis of a control signal from the microcomputer 31. When an encoder/decoder for audio data is provided, the sound output section 63 may output sound obtained by reproducing the audio data.

As described above, the image-capture element 13 in the image-capture device 100 receives light through the optical unit 11, photoelectrically converts the light into a signal, and sequentially supplies the signal to the AFE circuit 21. The signal is converted into digital image data through various types of processing and the resulting digital image data is sent to the camera-signal processing circuit 22.

Figure 2:
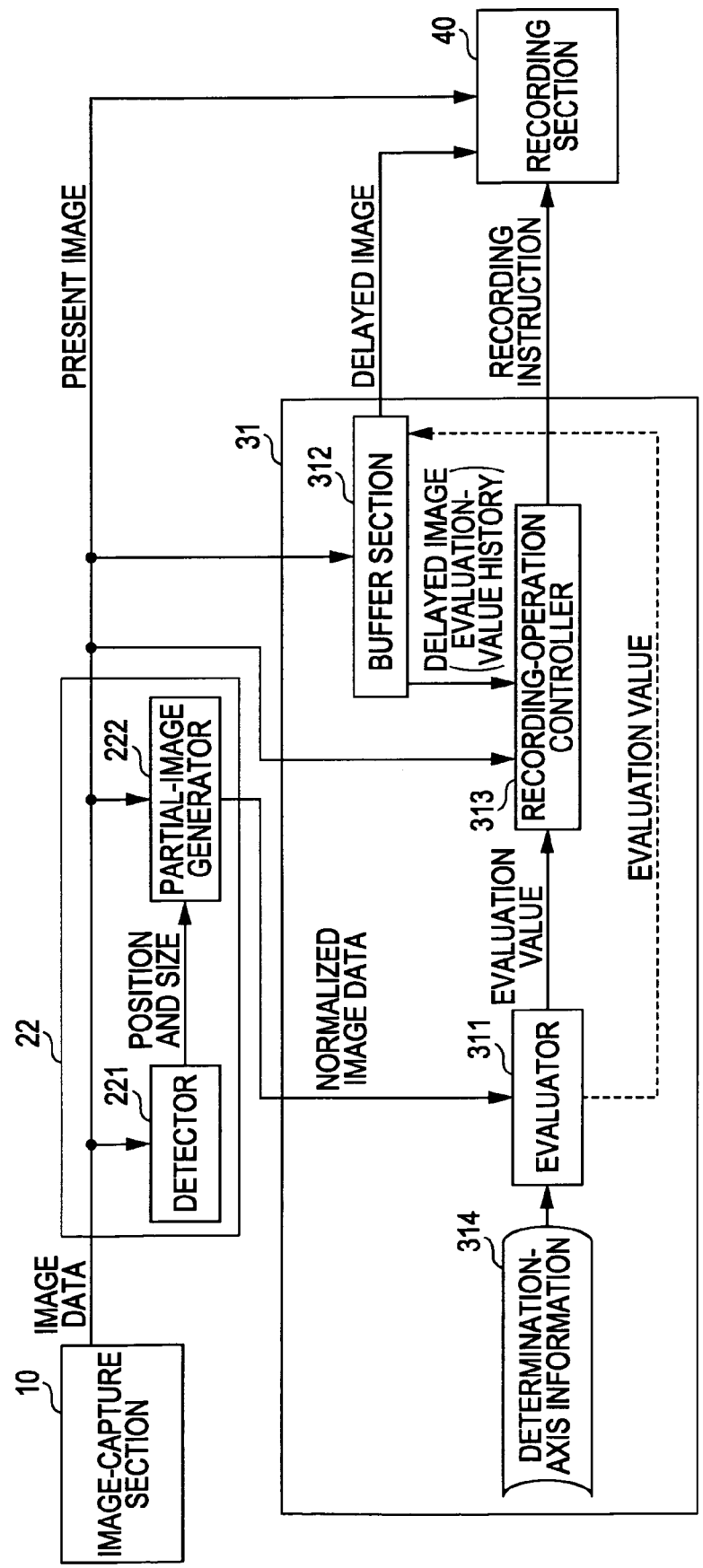
FIG. 2 is a block diagram showing a recording functional configuration of an image-capture device according to one embodiment of the present invention.

2. Recording Function of Image-Capture Device According to Embodiment of Invention A recording function of the image-capture device according to the embodiment will now be described with reference to FIGS. 2 and 3. FIG. 2 is a block diagram showing a recording functional configuration of the image-capture device according to the present embodiment.

[Recording Functional Configuration]

One example of the functional configuration of the camera-signal processing circuit 22 and the microcomputer 31, which are major sections for the recording function according to the embodiment and are described above with reference to the FIG. 1, will now be described with reference to FIG. 2.

The image-capture device according to the embodiment is adapted so that it can store captured images in a buffer or the like for a certain period of time so as to allow recording to be started from previous images in response to an instruction for starting recording, can detect a scene that is wanted be photographed most, and can automatically issue a recording-start instruction.

The image data captured by the image-capture section 10 is subjected to processing performed by the processor 20 and the controller 30 and is then recorded by the recording section 40. A description below is given of a functional configuration that can record a previous image as described above, that can detect a scene that is wanted to be photographed most, and that can automatically issue an instruction for starting recording.

The camera-signal processing circuit 22 has a detector 221 and a partial-image generator 222 in order to detect a scene that is wanted to be photographed most.

The detector 221 is a section for detecting a particular subject, and analyzes input image data and detects information such as a position and a size of a portion of a subject, the portion having a specific feature. The information detected in this case may include, for example, an orientation in addition to the position and the size.

The partial-image generator 222 is a section for cutting out a particular partial image of a captured image. The partial-image generator 222 receives image data from the image-capture section 10, receives information, such as the position and the size of a detected specific portion, from the detector 221, cuts out an image of a specific portion from the image data, and outputs the cutout image to the microcomputer 31.

The microcomputer 31 has an evaluator 311, a buffer section 312, a recording-operation controller 313, and determination-axis information 314, and so on.

The evaluator 311 is a functional section for determining a numerically expressed evaluation value of an attribute of the specific feature portion of the subject. On the basis of the determination-axis information 314 and normalized image data of the partial image received from the partial-image generator 222, the evaluator 311 evaluates a specific feature of the input image and sends a determined evaluation value to the recording-operation controller 313.

The evaluation value determined by the evaluator 311 may be directly sent to the recording-operation controller 313 so as to be used as determination information for starting a recording operation. The evaluation value determined by the evaluator 311 may be sent to the recording-operation controller 313 and the buffer section 312 so that evaluation values for a certain period of time are stored in the buffer section 312.

When the evaluation values are stored in the buffer section 312, the recording-operation controller 313 may receive an evaluation value at the present point from the evaluator 311 and receive evaluation-value history stored in the buffer section 312, so as to use the received evaluation value and evaluation-value history as determination information for the recording-start operation.

The buffer section 312 serves as a temporary storage section that can store a certain amount of data and constantly holds captured images, sound, and so on for a certain amount of time.

Since the buffer section 312 is provided, the recording-operation controller 313 can start recording from previous images, stored in the buffer section 312, in addition to the present image. Thus, there is the advantage of preventing missing photographing which is caused by a late recording-start operation.

As described above, the buffer section 312 may also store the evaluation values. Since the stored evaluation values are stored, the recording start point can be determined based on the evaluation values.

The recording-operation controller 313 is a functional section for controlling the overall recording operation. In the present embodiment, upon detecting that an evaluation value received from the evaluator 311 satisfies a predetermined condition, the recording-operation controller 313 issues an instruction for starting a recording operation.

The recording-operation controller 313 can record images that are stored in the buffer section 312 and that are earlier than the recording start point, in addition to the image being presently photographed.

Needless to say, the recording-operation controller 313 can first record an image at the recording-start time, rather than the previous images. This arrangement allows setting to be performed so that recording is automatically started upon detection of a certain condition. Thus, it can be expected that missing photographing which is caused by a failure of a recording operation can be prevented.

The determination-axis information 314 is information that the evaluation section 311 uses to perform evaluation for determining a numerically expressed evaluation value of a specific feature of a subject. The determination-axis information 314 is pre-stored in, for example, an internal memory, such as a ROM.

A description in the present embodiment has been given of an example in which the detector 221 and the partial-image generator 222 in the camera-signal processing circuit 22 are realized by hardware and the functional sections of the microcomputer 31 are realized as software functions.

Needless to say, however, those functions may be realized by hardware and/or software.

For software, the functions may be realized by, for example, causing the CPU of the microcomputer 31 to execute a program stored in the memory, such as the ROM or the RAM (which are not shown).

The CPU may operate using the RAM as a work area, for example, on the basis of the program stored in the ROM.

[Flow of Recording Functional Operation]

Figure 3:
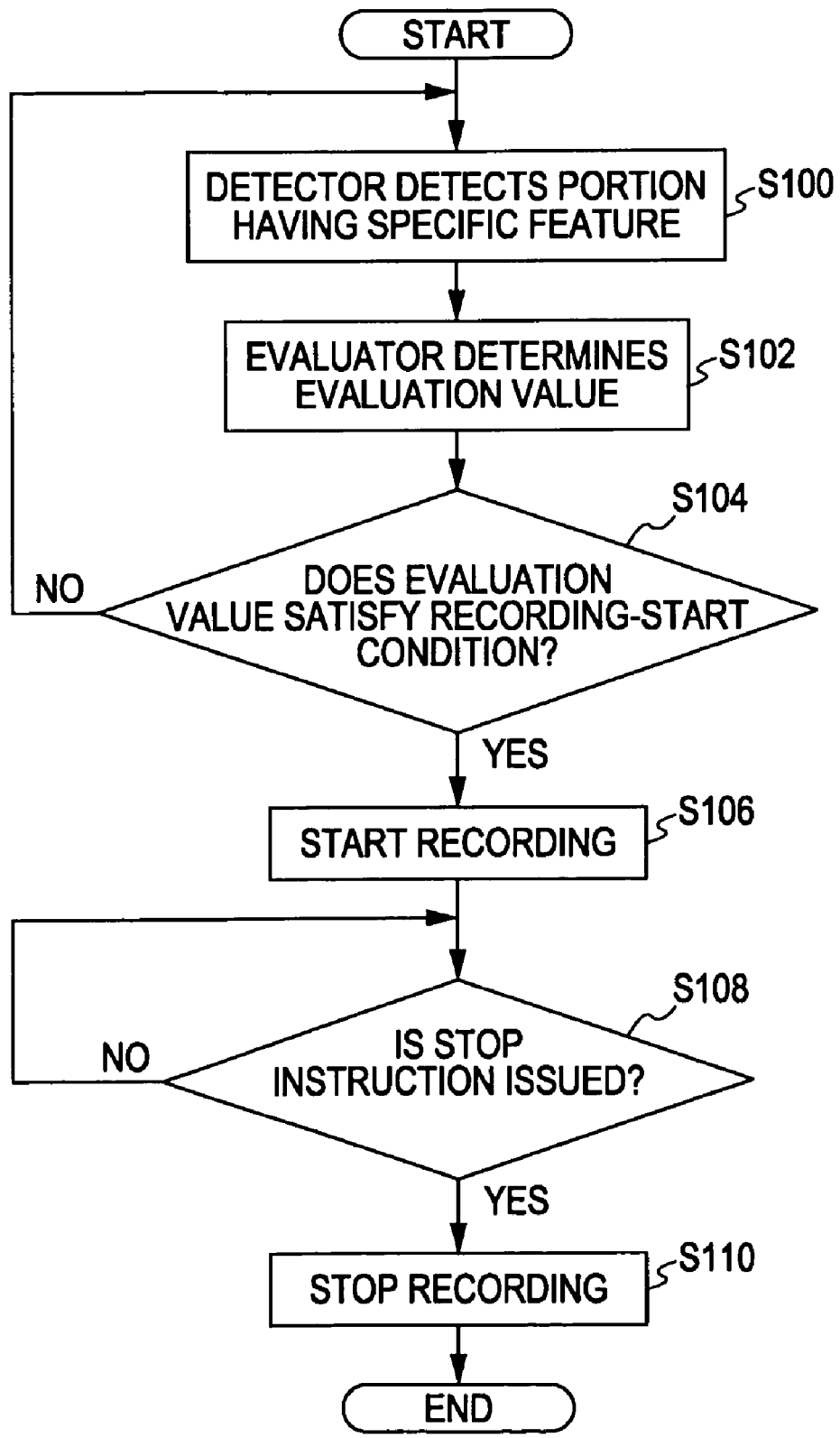
FIG. 3 is a flowchart showing the operation of the recording function of the image-capture device according to the present embodiment.

Next, a description will be given of a flow of the recording operation realized by the recording functional configuration shown in FIG. 2. FIG. 3 is a flowchart showing the operation of the recording function of the image-capture device according to the present embodiment.

First, in step S100, the detector 221 detects a portion having a specific feature from an image captured by the image-capture section 10. Next, in step S102, the evaluator 311 determines a numerically expressed evaluation value of specific feature of the portion detected by the detector 221.

The portion detected in this case may be, for example, a human face, and the evaluation value may be a numerically expressed value of a human facial expression. In this case, the facial expression to be evaluated may be a smile, an angry face, or a crying face, and such a facial expression may be expressed as the evaluation value.

The portion detected in this case may also be, for example, a firefly, and the evaluation value may be a numerically expressed value of the intensity of light of the firefly. For example, it is possible to detect the intensity of light and to capture an image of a scene after or before the firefly begins to emit light.

The portion detected in this case may be an animal, insect, or the like, and the evaluation value may be a numerically expressed value of a movement (the amount of change in a state). For example, it is possible to capture an image at a moment when an elephant moves the long trunk at a zoological park.

The portion detected may be any other portion that is identifiable and that has a numerically expressible feature.

In step S104, a determination is made as to whether or not the evaluation value satisfies a predetermined recording-start condition. When the condition is satisfied, recording is started in step S106.

In this case, an arbitrary condition can be set as the recording-start condition. The arbitrary condition may be, but is not limited to, a condition that the evaluation value is greater than or equal to a certain threshold or a condition that the rate of increase of the evaluation value is greater than or equal to a certain threshold.

During start of recording, recording can be started from a delayed image held in the buffer section 312, and the recording-start image can be arbitrary set.

The recording-start image may be one that is earlier than a predetermined time on the basis of time, or may be an image when a predetermined condition is satisfied on the basis the evaluation value of history of stored evaluation values.

Next, in S108, a determination is made as to whether or not a stop instruction is issued. The recording is continued until the stop instruction is issued. When the stop instruction is issued, the recording is stopped in step S110.

The stop instruction may be issued by the photographing person pressing a stop button or the like or may be issued through setting of an arbitrary stop condition. Alternatively, the stop instruction may be issued when a predetermined time passes or may be issued when a certain condition is satisfied based on the evaluation value, but is not limited thereto.

While the operation of recording has been described above, first and second illustrative examples will be described below in detail in conjunction with a specific example in which the detected portion is a human face and the evaluation value is a numerically expressed value of the degree of smile.

Figure 4:
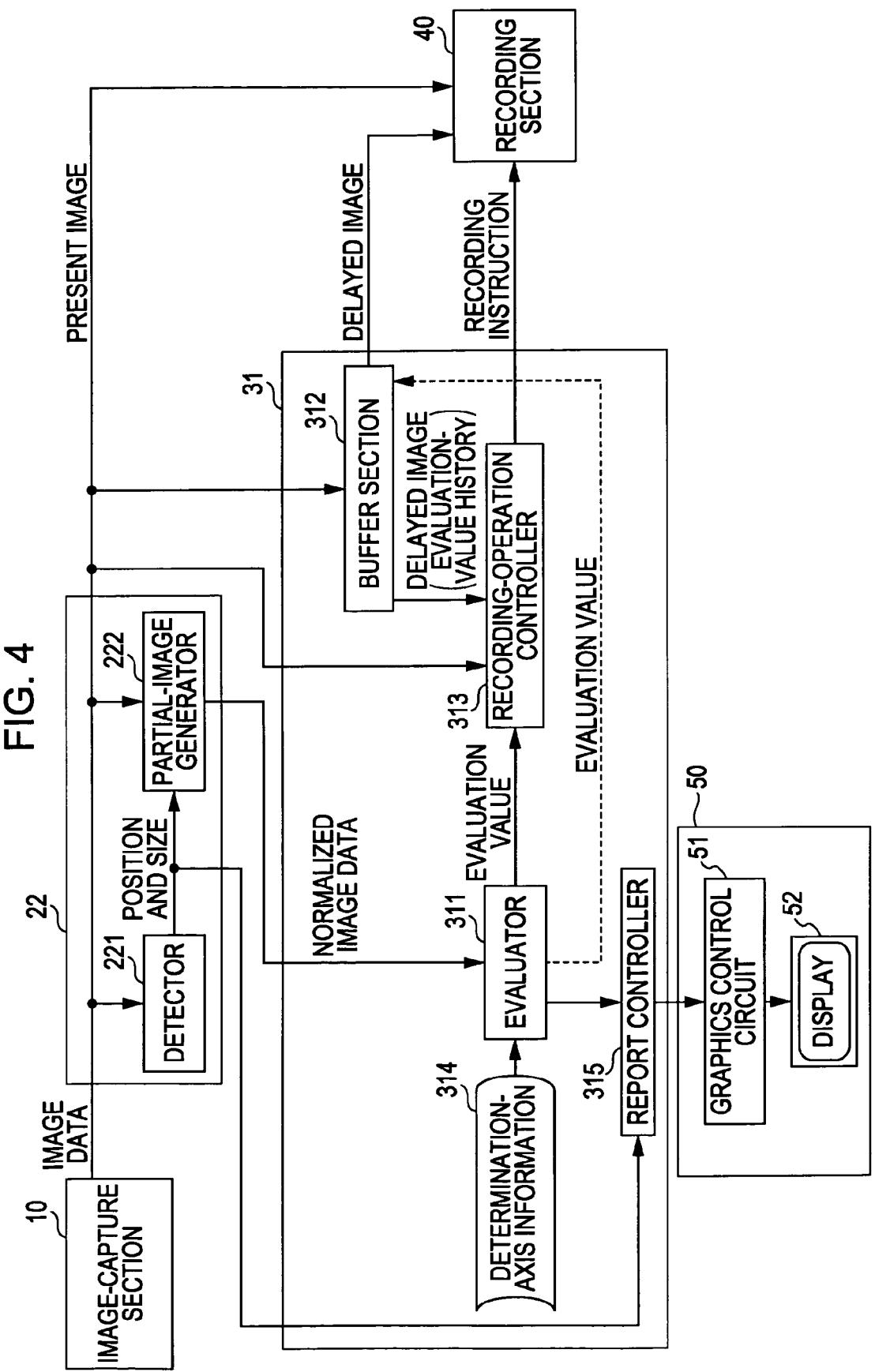
FIG. 4 is a block diagram showing a reporting functional configuration of the image-capture device according to the present embodiment.

3. Display Functional Configuration of Image-Capture Device According to Embodiment of Invention A functional configuration for display according to the present embodiment will be described next with reference to FIG. 4. FIG. 4 is a block diagram showing a display functional configuration in addition to the recording functional configuration shown in FIG. 2. The same sections as those described with reference to FIG. 2 are not described hereinafter.

The microcomputer 31 shown in FIG. 4 has a report controller 315. On the basis of the evaluation value received from the evaluator 311, the report controller 315 issues an instruction to the graphics control circuit 51 so as to report the degree of a specific facial expression to the operator by using a graph, icons, and so on, in accordance with a predetermined reporting method.

Information such as the position and the size of a specific portion of a subject detected by the detector 221 may also be displayed on the display 52 so that a portion to be evaluated can be identified based thereon.

Although not shown, the operator may be notified with sound when the evaluation value exceeds a certain threshold or may be notified with light emission.

In response to an instruction from the report controller 315, the graphics control circuit 51 controls a method for displaying, on the display 52, a delayed image from the buffer section 312 and a present image from the processor 20. A specific example of display will be described below in detail in conjunction with first and second illustrative examples.

4. First Illustrative Example

A series of flows of a first illustrative example of a moving-image photography using the image-capture device according to the embodiment will be described next with reference to FIGS. 5 to 7B.

Figure 5:
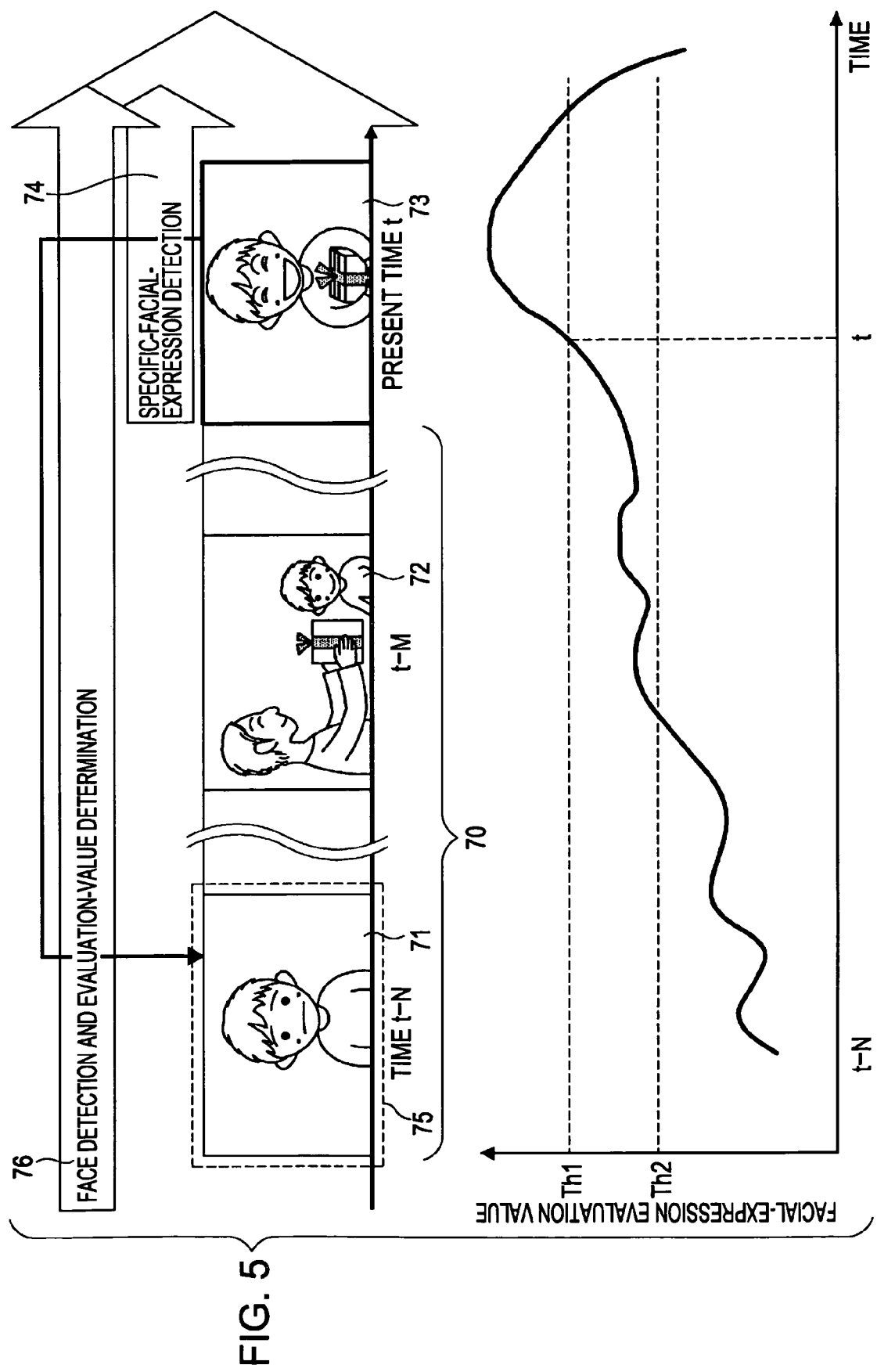
FIG. 5 is a diagram showing the operation of a first illustrative operation of photography using the image-capture device according to the present embodiment.
Figure 6:
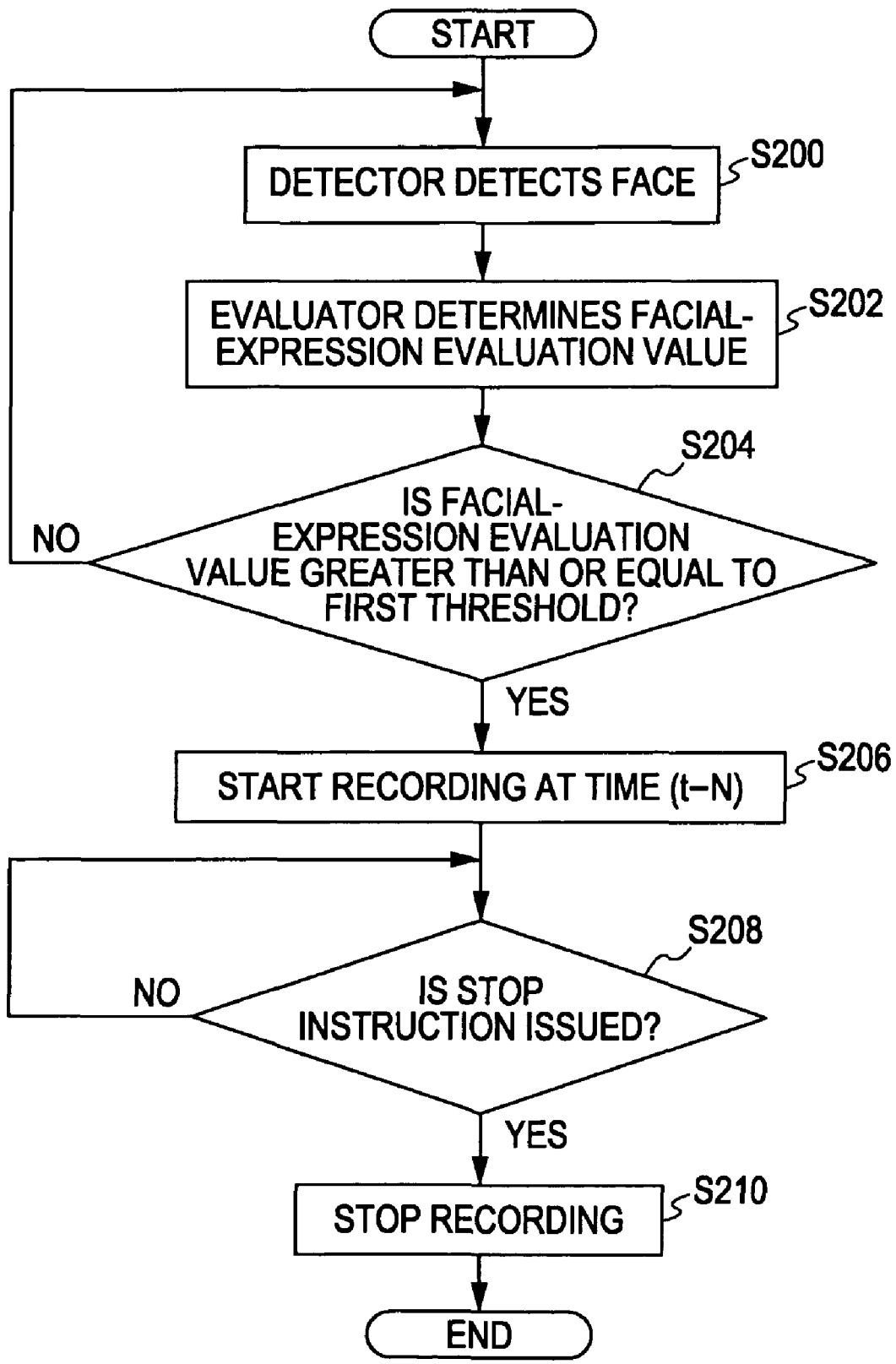
FIG. 6 is a flowchart showing the operation during the photography shown in FIG. 5.

FIG. 5 is a diagram illustrating captured images in the first illustrative example of photography using the image-capture device according to the embodiment of the present invention and changes of the facial-expression evaluation values. FIG. 6 is a flowchart showing the operation of the image-capture device in this case.

A description in the first illustrative example will be given of an example in which a human face is detected and a facial-expression evaluation value for evaluating to what degree the facial expression is closer to a smile is determined, and recording is started from an image that is earlier by a predetermined amount of time N when it is determined that the facial-expression evaluation value exceeds a first threshold.

A description is given below with reference to FIGS. 5 and 6 in which t indicates smile detection time, N indicates a buffer time, and Th1 indicates a first threshold of a facial evaluation value.

First, the photographing person powers on the image-capture device to perform an operation for starting photography. Images captured by the image capture are stored as delayed images 70 until the maximum time N is reached. When the amount of time N is passed, images corresponding to the amount of time N are constantly stored while older images are sequentially overwritten thereby.

At the same time, in step S200, the detector 221 performs face detection on the image that is presently being captured. In step S202, the evaluator 311 determines a facial-expression evaluation value. In step S204, a determination is made as to whether or not the facial-expression evaluation value is greater than or equal to the first threshold Th1.

An already available method may be used as a method for determining the evaluation value. For example, a scheme disclosed in Japanese Unexamined Patent Application Publication No. 2008-42319 may be used.

At the times of images 71 and 72 shown in FIG. 5, the facial-expression evaluation values do not reach the first threshold Th1, so that the operations in steps S200 to S204 are repeated. At the time of image 73, the facial-expression evaluation value reaches the first threshold value Th1, so that the recording start condition is satisfied. Thus, in step S206, recording is started from image 71 at time t-N.

Although a recording-start image 75 is an image that is earlier by a predetermined amount of time and the oldest one (at t-N) of the images stored in the buffer section 312 is first recorded, the arrangement may also be such that the photographing person can preset the recording-start image 75 within the buffer time.

After the start of the recording, the recording is continued until the stop instruction is issued. When it is determined in step S208 that the stop instruction is issued, the process proceeds to step S210 in which the recording is stopped.

The stop instruction may be issued when the operator presses the stop button or the like. Alternatively, for example, the recording may be automatically stopped when a predetermined amount of time passes from time t at which the facial-expression evaluation value reaches the first threshold Th1 or when a predetermined amount of time passes from time t at which the facial-expression evaluation value falls below the first threshold Th1 after the start of the recording.

While the recording operation of the image-capture device according to the first embodiment has been described above, the use of the image-capture device makes it possible to reliably prevent missing photographing since the image-capture device can detect a facial expression that is wanted to be recorded most, can record images before and after the image of the detected facial expression, and can automatically determine start of recording to perform operation.

[Example of Display]

Figure 7A:
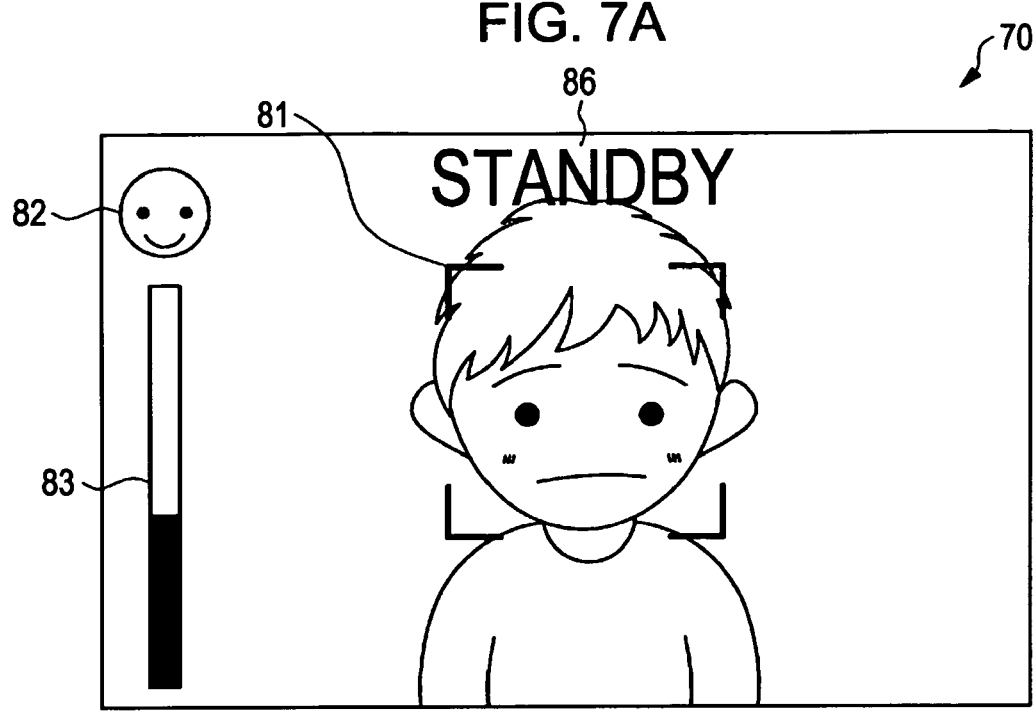
FIGS. 7A and 7B illustrate examples of images displayed on the display of the image-capture device according to the present embodiment.
Figure 7B:
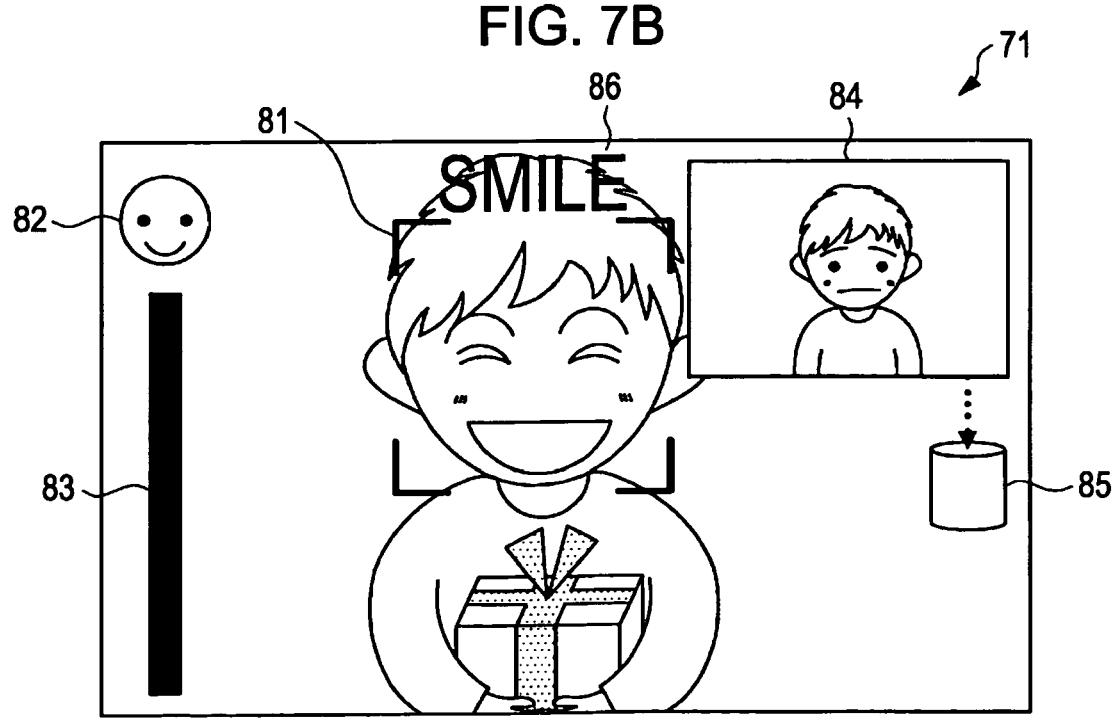

One example of display during the operation will now be described with reference to FIGS. 7A and 7B. A standby screen 70 (shown in FIG. 7A) is one example of display in a standby state (e.g., at the times of images 71 and 72 shown in FIG. 5) while face detection is in operation. A screen 71 (shown in FIG. 7B) displayed upon detection is one example of display when recording is started (e.g., at the time of image 73 shown in FIG. 5).

In the standby state, when a face is detected, a frame 81 specifying the detected portion, a mark 82 indicating that face detection/evaluation is being performed, and a graph 83 representing a state of the present evaluation value may be displayed.

During the start of recording, similarly, a window showing a delayed image being recorded and an icon 85 indicating that the image is being recorded may be displayed in addition to the frame 81 specifying the position of a detected face, the mark 82 indicating that face detection/evaluation is being performed, and the graph 83 representing the state of the facial-expression evaluation value.

5. Second Illustrative Example

A second illustrative example will be described next. A second illustrative example is the same as the first illustrative example in that a previous image is first recorded when the facial-expression evaluation value reaches the first threshold value Th1, but is different in that the recording-start image is determined on the basis of the evaluation value during the start of the recording.

Since the recording-start image is determined on the basis of the evaluation value during detection of a recording-start condition, the second illustrative example has a configuration in which evaluation-value history is also stored in the buffer section 312.

A description is given below with reference to FIGS. 8 to 12B in which t indicates smile detection time, N indicates a buffer time, Th1 indicates a first threshold of the facial evaluation value, Th2 indicates a second threshold of the facial evaluation value, and t-M indicates a recording-start time.

Figure 8:
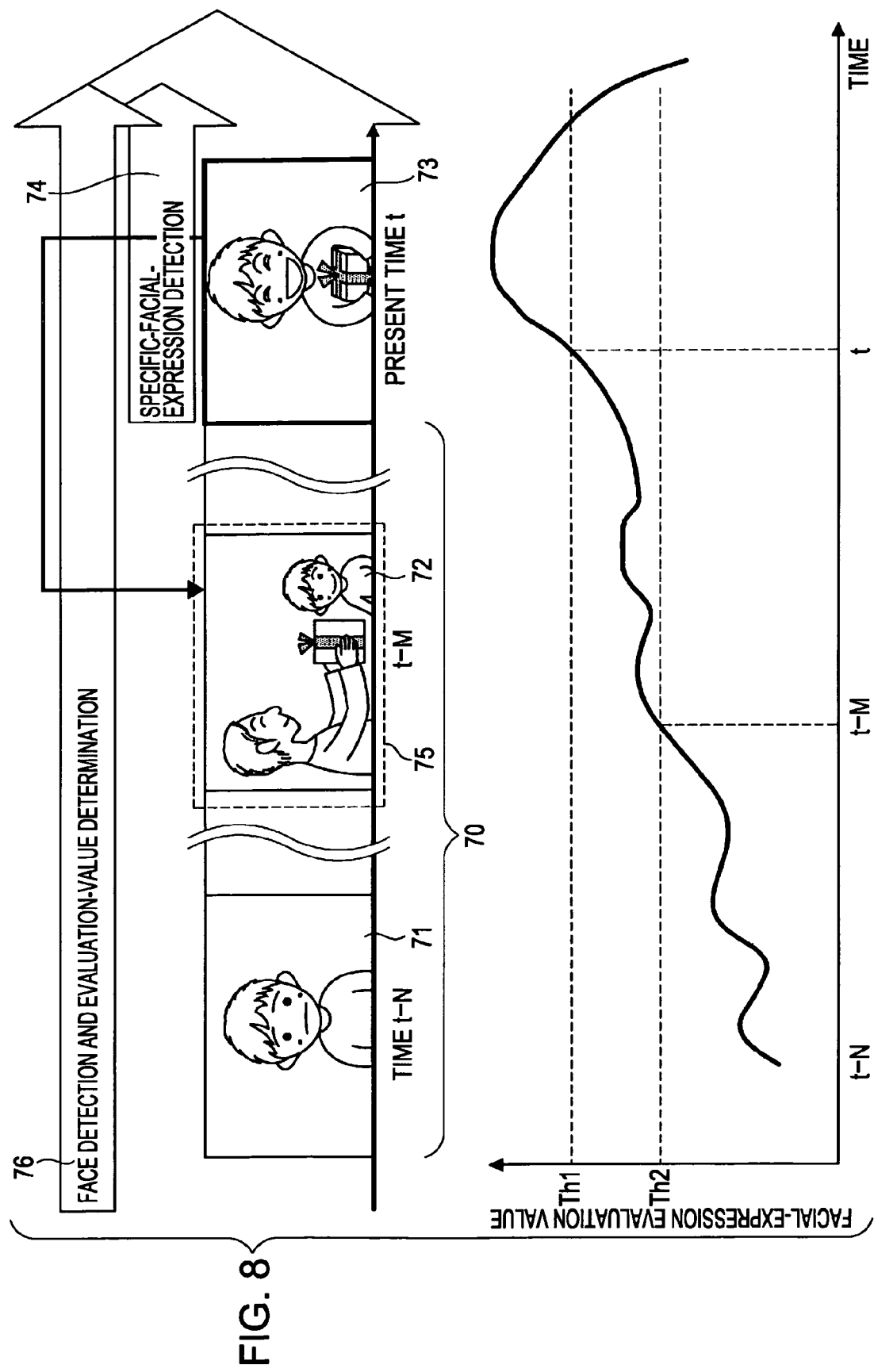
FIG. 8 is a diagram illustrating the operation of a second illustrative operation of photography using the image-capture device according to the present embodiment.
Figure 9:
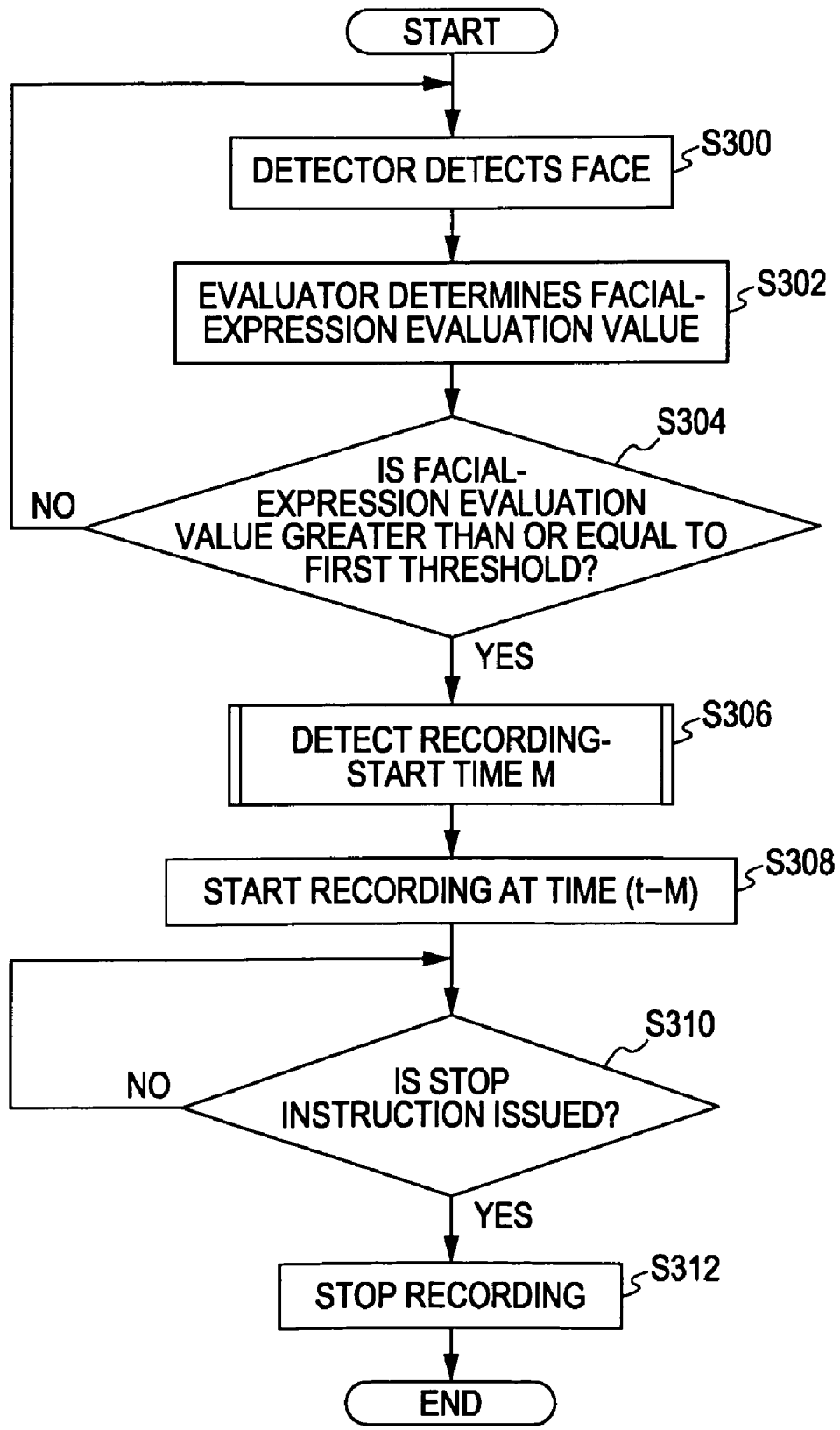
FIG. 9 is a flowchart showing the operation during the photography shown in FIG. 8.

FIG. 8 is a diagram illustrating flows of image capture according to the second illustrative example using the image-capture device according to the embodiment of the present invention. FIG. 9 is a flowchart showing flows of the image capture in this case.

First, the photographing person powers on the image-capture device to perform an operation for starting photography. Images captured by the image capture are stored as delayed images 70 until the maximum time N is reached. When the amount time N is passed, images corresponding to the amount of time N are constantly stored while older images are sequentially overwritten thereby.

At the same time, in step S300, the detector 221 performs face detection on the image that is presently being captured. In step S302, the evaluator 311 determines a facial-expression evaluation. At the same time when the determined facial-expression evaluation value is stored in the buffer section 312, a determination is made in step S304 as to whether or not the facial-expression evaluation value is greater than or equal to the first threshold Th1.

At the times of images 71 and 72 shown in FIG. 8, the facial-expression evaluation value does not reach the first threshold Th1, so that the operations in steps S300 to S304 are repeated. At the time of image 73, the facial-expression evaluation value reaches the first threshold value Th1, so that the recording start condition is satisfied. Thus, in step S306, a recording-start time is detected.

A specific example of the recording-start time detection is described in detail below with reference to FIGS. 10 and 11. Although the recording-start image in the first illustrative example is one obtained before a predetermined time and is determined based on time, the recording start image in the second illustrative example is determined based on the evaluation values in the buffer section 312.

In step S308, recording is started at recording-start time t-M. The recording is continued until a stop instruction is issued. When it is determined in step S310 that the stop instruction is issued, the recording is stopped in step S312.

[Recording-Start Time Detection]

Next, an operation flow of recording-start time detection will be described with reference to FIGS. 8, 9, and 10. First, a description will be given of the recording-start time detection using the facial-expression evaluation value and the second threshold Th2. FIG. 10 is sub-flowchart of part of the recording-start time detection shown in FIG. 9.

Figure 10:
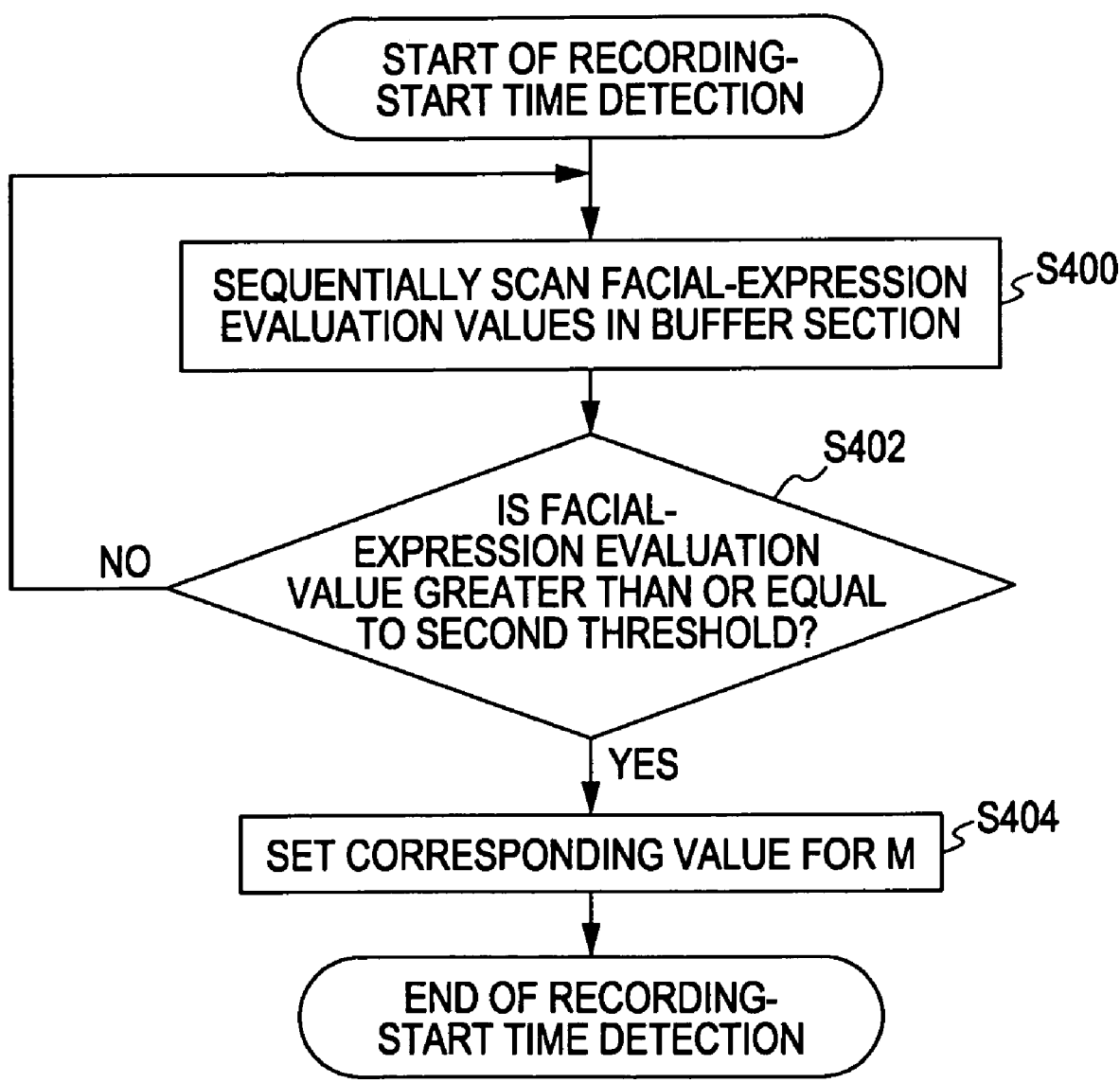
FIG. 10 is one example of a sub-flowchart shown in FIG. 9.
Figure 11:
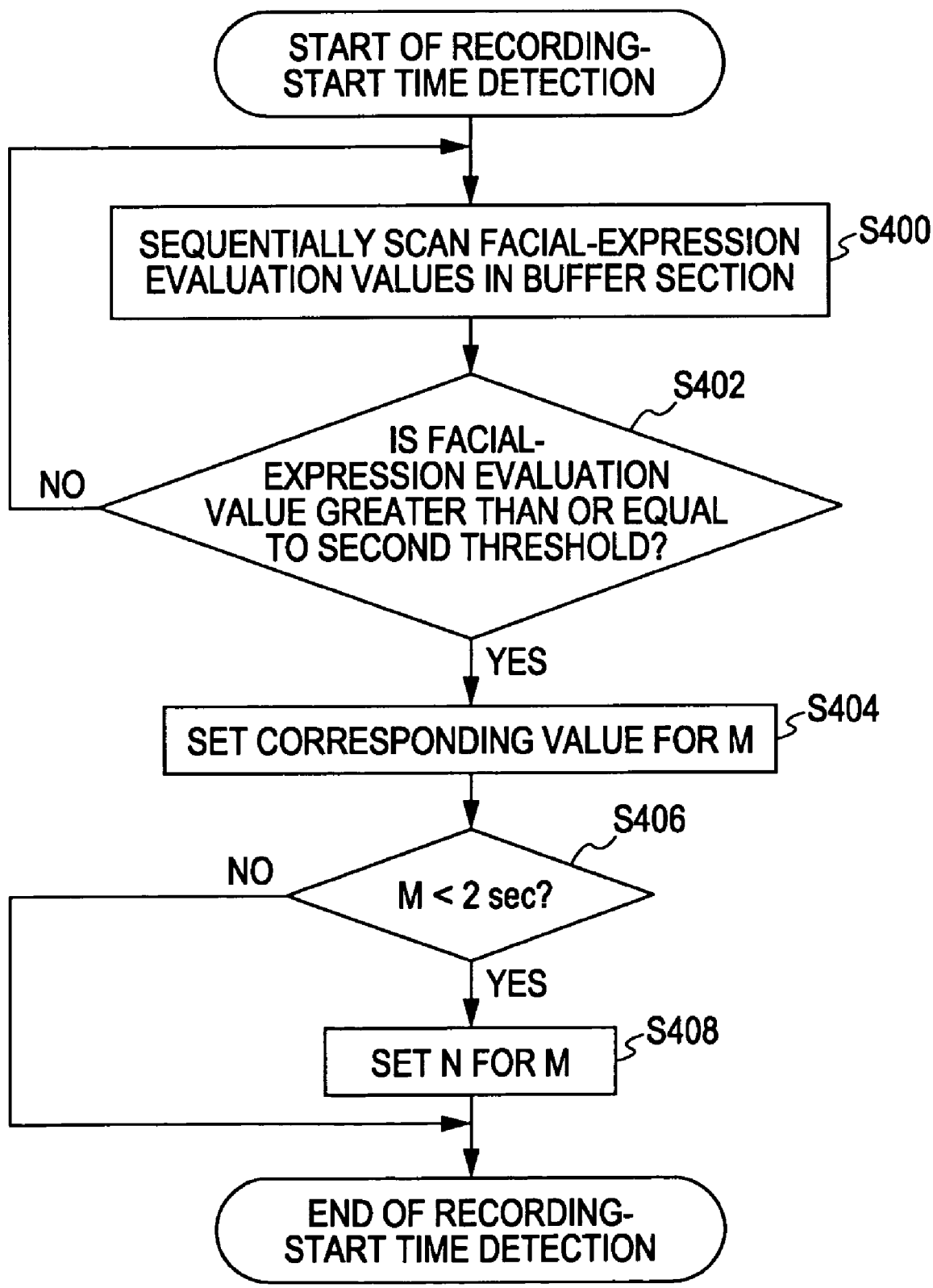
FIG. 11 is a flowchart showing a modification of the example shown in FIG. 10.

When it is determined in step S304 in FIG. 9 that the facial-expression evaluation value is greater than or equal to the first threshold value Th1, the process proceeds to step S400 in FIG. 10. In step S400, the evaluation values stored in the buffer section 312 are sequentially scanned. The scanning may be sequentially performed from the smile detection time t back to an earlier time or may be sequentially scanned from t-N.

In step S402, a determination is made as to whether or not the scanned facial-expression evaluation value is greater than or equal to the second threshold Th2. When the facial-expression evaluation value is greater than or equal to the second threshold Th2, the process proceeds to step S404 in which a value corresponding to the time is set for M.

In this case, t-M is the recording-start time and is earlier than the present time t by M. Since M is selected from times corresponding to the images and evaluation values stored in the buffer section 312, M has a value that is smaller than or equal to the maximum buffer time N.

When the recording-start image is determined based on the evaluation value during the start of the recording in the manner described above, finer controller can be performed and only a desired image can be recorded more efficiently.

According to the second illustrative example in which the second threshold Th2 is used, when a child's smile is to be photographed, an image at the point of time at which the child's facial expression begins to change can also be recorded.

[Modification of Recording Time Detection]

Next, a modification of the recording-time detection shown in FIG. 10 will be described with reference to FIG. 11. FIG. 11 shows a specific example of the recording-time detection shown in FIG. 9. This specific example is also a modification of the processing shown in the sub-flowchart in FIG. 10.

Since steps S400 to S404 are analogous to those in FIG. 10, the descriptions thereof are not given hereinafter. After a value corresponding to the time at which the facial-expression evaluation value is greater than or equal to the second threshold Th2 is set for M in step S404, a determination is made in step S406 as to whether or not M is smaller than a predetermined threshold.

In the present embodiment, for example, when M has a value that is smaller than two seconds, N is set for M in step S408. The buffer time N is a maximum time in which the facial-expression evaluation values can be stored in the buffer section 312.

This setting is more preferably used, for example, in a case in which photography in a very short period of time is not appropriate when a facial expression changes rapidly. For example, the setting may also be useful when a condition that a time after a predetermined time has passed from smile detection is used as the stop condition.

Although an example in which M is replaced with the buffer time when M has a value that is smaller than two seconds has been described above, it goes without saying that M may have another value. For example, M may be set to have a fixed value in the image-capture device or may be made pre-settable by the operator.

[Example of Display]

Figure 12A:
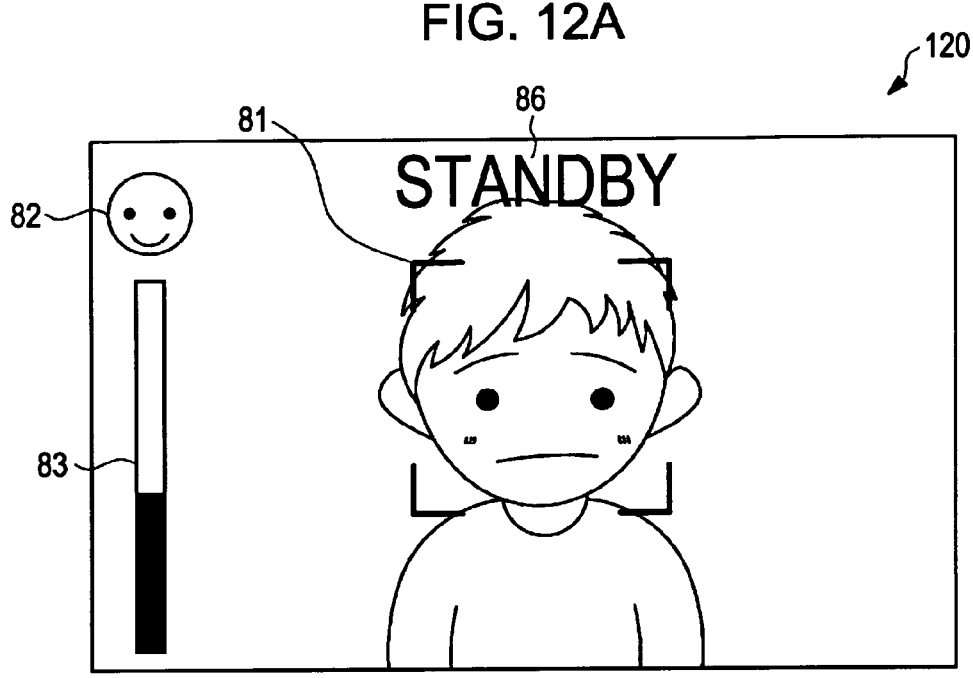
FIGS. 12A and 12B illustrate examples images displayed on the display of the image-capture device according to the present embodiment.
Figure 12B:
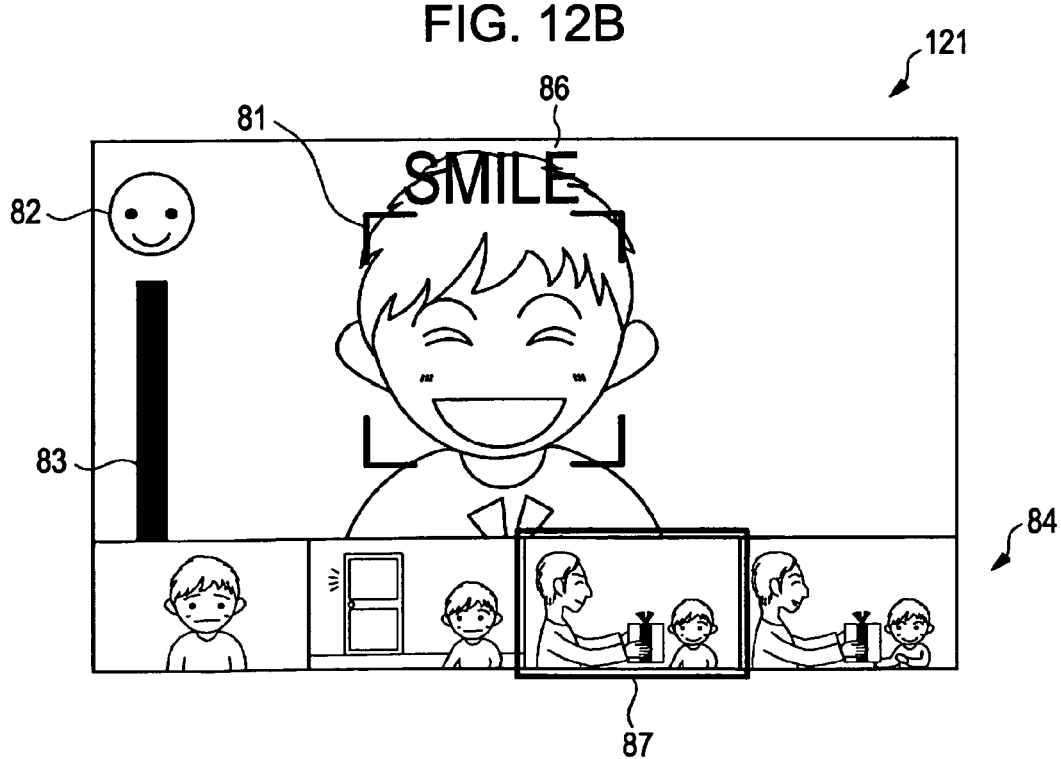

One example of display during the operation will now be described with reference to FIGS. 12A and 12B. A standby screen 120 (shown in FIG. 12A) is one example of display in a standby state (e.g., at the times of images 71 and 72 shown in FIG. 8) while face detection is in operation. A screen 121 (shown in FIG. 12B) displayed upon detection is one example of display when recording is started (e.g., at the time of image 73 shown in FIG. 8).

The example in the standby state is illustrated for comparison with the display during the start of the recording and is the same as in the first illustrative example illustrated in FIG. 7A, thus a description thereof is not given hereinbelow.

During the start of recording, some 84 of delayed images may be further displayed in addition to the frame 81 indicating the position of a detected face, the mark 82 indicating that face detection/evaluation is being performed, and the graph 83 representing the state of the facial-expression evaluation value, as in the case of the standby state.

The delayed images 84 displayed may be extracted images having features, such as large changes, determined based on the evaluation values. The delayed images 84 may also be displayed at regular intervals.

A recording-start image 87 may be displayed in a highlighted manner so that is can be distinguished.

6. Conclusion

The configuration and the functional operation of the image-capture device according to the embodiment of the present invention and the flows of image capture using the image-capture device according to the embodiment have been described above in conjunction with the examples.

In any of the illustrative examples described above, a specific feature of a subject is detected and a delayed image is constantly stored in the buffer section 312 when a live image is displayed. Thus, a previous image can be recorded in addition to an image presently being captured when photography is started.

With this arrangement, when the photographing person operates a photography-start button and directs the image-capture device to a subject, recording is automatically started depending on a detected situation. For example, when the photographing person is to photograph a child, a load involved in the photography is reduced since he or she can concentrate on the child.

For example, in a case in which a subject is an animal or an insect and when a particular situation appear is unclear, the load of the photographing person can be reduced since photography can be automatically started upon securing and setting the image-capture device.

Since it is possible to record images of only a desired situation without recording images of an unwanted portion, it is not necessary to search for a desired portion from recorded images later, thus making editing easier. The amount of wasted resources of a recording medium can also be reduced.

In typical image-capture devices, directing it to a subject does not mean that recording is being performed. Thus, a subject may become nervous to look unnatural. However, with the image-capture device according to the embodiment of the present invention, recording is not started until a particular situation appears, thus making it possible to obtain more natural images of a subject.

Although the preferred embodiment of the present invention has been described above in detail with reference to the accompanying drawings, the present invention is not limited to the embodiment. It is apparent to those who are skilled in the art that various modification and changes can be made within the spirit or scope of the present invention and it goes without saying that such modifications and changes are also encompassed by the technical scope of the present invention.

For example, although the above embodiment has been given in conjunction with the example of smile detection, the present invention is not limited thereto. For example, the present invention may be applied to not only a smile but also an angry face or crying face.

In addition, the subject is not limited to a person exemplified in the embodiment, and the image-capture device according to the present invention can be applied to any subject that can be expressed as a numerical evaluation value of a particular attribute of the subject.

As described above, for example, the portion detected may be a firefly and the evaluation value may be a numerically expressed value of the intensity of light of the firefly.

Similarly, as described above, the portion detected may be an animal, insect, or the like, and the evaluation value may be a numerically expressed value of a movement (the degree of change in a state), and is not limited to such an example, as long as the portion is detectable and a feature thereof is numerically expressible.

Although images and sound are recorded to a recording medium in the above-described embodiment, the determined evaluation values may also be recorded together with the images and sound. In this case, the image-capture device may be configured so that, after the recording, for example, an image can be searched for based on the evaluation values. This arrangement makes it easier to play back an image captured at the moment of a smile.

In the above-described embodiment, although a method for using the second threshold has been described when the recording-start point is determined based on the evaluation value, the multiple conditions may be combined to perform control.

Although a case in which a moving image is recorded has been described in the above-described embodiment, for example, successive still images for each predetermined amount of time may be recorded from images stored in the buffer section.

Similarly, a point having a feature may be detected from the images stored in the buffer section on the basis of the evaluation values, so that one or multiple detected still images can be recorded.

It should be understood by those skilled in the art that various modifications, combinations, sub-combinations and alterations may occur depending on design requirements and other factors insofar as they are within the scope of the appended claims or the equivalents thereof.

What is claimed is:

1. An image-capture device comprising:
   an image-capture section that captures an image of a subject;
   a detector that detects a portion of the subject, the portion having a specific feature, from the image captured by the image-capture section;
   an evaluator that determines a numerically expressed evaluation value of the specific feature of the portion detected by the detector;
   a buffer section that temporarily stores delayed images corresponding to a predetermined amount of time; and
   a recording-operation controller that controls the image-capture device to record image data including a predetermined delayed image in the buffer section, upon determining that the evaluation value satisfies a predetermined condition, in which the buffer section stores a number of evaluation values in a period of time so as to form an evaluation value history, and
   in which the recording-operation controller determines a start image for recording in the buffer section based on the evaluation value history when the evaluation value is determined to satisfy the predetermined condition.

2. The image-capture device according to claim 1, wherein the predetermined condition is that the evaluation value is greater than or equal to a first threshold.

3. The image-capture device according to claim 1, wherein the predetermined condition is that a rate of increase in the evaluation value is greater than or equal to a predetermined threshold.

4. The image-capture device according claim 2, wherein the start image for recording is at a point of time when the evaluation value history in the buffer section is greater than or equal to a second threshold value which is less than the first threshold value.

5. The image-capture device according to claim 1, wherein the subject is a person and the evaluation value is a value obtained by evaluating a facial expression.

6. The image-capture device according to claim 2, wherein after recording is started, the recording-operation controller controls the image-capture device to stop the recording when a certain amount of time passes after the evaluation value falls below the first threshold.

7. The image-capture device according to claim 1, wherein the recording-operation controller controls the image-capture device to record the evaluation value corresponding to an image to be recorded, in conjunction with the image.

8. An image-capture method for an image-capture device, the method comprising the steps of:
   capturing an image of a subject;
   detecting a portion of the subject, the portion having a specific feature;
   determining a numerically expressed evaluation value of the specific feature of the detected portion;
   determining whether or not the evaluation value satisfies a predetermined condition;
   storing a number of evaluation values in a period of time so as to form an evaluation value history;
   determining a recording-start time; and
   recording image data from the recording-start time,
   in which the recording-start time is determined based on the evaluation value history when the evaluation value is determined to satisfy the predetermined condition.

9. A non-transitory computer readable memory having stored thereon an image-capture program for causing an image-capture device to execute the steps of:
   capturing an image of a subject;
   detecting a portion of the subject, the portion having a specific feature;
   determining a numerically expressed evaluation value of the specific feature of the detected portion;
   determining whether or not the evaluation value satisfies a predetermined condition;
   storing a number of evaluation values in a period of time so as to form an evaluation value history;
   determining a recording-start time; and
   recording image data from the recording-start time,
   in which the recording-start time is determined based on the evaluation value history when the evaluation value is determined to satisfy the predetermined condition.

* * * * *